(12) United States Patent
Allen et al.

(10) Patent No.: US 8,708,000 B2
(45) Date of Patent: Apr. 29, 2014

(54) BORE PLUG

(75) Inventors: John R. Allen, Trinity, TX (US); Lloyd J. Lesikar, Caldwell, TX (US)

(73) Assignee: Postoak Services, Inc., Caldwell, TX (US)

( * ) Notice: Subject to any disclaimer, the term of this patent is extended or adjusted under 35 U.S.C. 154(b) by 439 days.

(21) Appl. No.: 13/085,332

(22) Filed: Apr. 12, 2011

(65) Prior Publication Data

US 2011/0258834 A1    Oct. 27, 2011

Related U.S. Application Data

(60) Provisional application No. 61/328,416, filed on Apr. 27, 2010.

(51) Int. Cl.
*F16L 55/11* (2006.01)
*B23P 11/00* (2006.01)

(52) U.S. Cl.
USPC .............................................. 138/89; 29/525

(58) Field of Classification Search
USPC ......... 29/525, 238; 138/89, 90; 73/49.8, 49.3; 215/294; 277/339; 251/148
See application file for complete search history.

(56) References Cited

U.S. PATENT DOCUMENTS

| | | | | | |
|---|---|---|---|---|---|
| 3,472,520 | A | * | 10/1969 | Burns | 277/339 |
| 4,474,216 | A | * | 10/1984 | Noe | 138/89 |
| 4,602,500 | A | * | 7/1986 | Kelly | 73/49.8 |
| 4,760,868 | A | * | 8/1988 | Saxon | 138/89 |
| 4,968,197 | A | | 11/1990 | Chen | |
| 5,065,981 | A | * | 11/1991 | Vario | 251/148 |
| 5,119,861 | A | | 6/1992 | Pino | |
| 5,771,937 | A | | 6/1998 | Collins | |
| 5,797,431 | A | * | 8/1998 | Adams | 138/89 |
| 2004/0074549 | A1 | | 4/2004 | Allen | |

\* cited by examiner

*Primary Examiner* — John C Hong
(74) *Attorney, Agent, or Firm* — Edwin S. Flores

(57) ABSTRACT

An apparatus and method for plugging a tubular bore is disclosed herein. The apparatus comprises: a shaft member; one or more cylindrical compressible seals slideably disposed around the shaft member, wherein the shaft member passes axially through the one or more cylindrical seals; one or more cylindrical hard sleeves having one or more conical ends slideably disposed around the shaft member and adjacent to the one or more cylindrical seals; a flange attached at or near a distal end of the shaft member, wherein the flange retains the cylindrical sleeves and cylindrical seals on the shaft member; and a pulling mechanism disposed at or near a proximal end of the shaft member, wherein the seal is positioned between the flange and the one or more cylindrical hard sleeves such that compression of the seal causes it to expand away from the shaft member.

20 Claims, 5 Drawing Sheets

BORE PLUG

CROSS-REFERENCE TO RELATED APPLICATIONS

This patent application is a non-provisional application of U.S. provisional patent application 61/328,416 filed on Apr. 27, 2010 and entitled "Bore Plug" which is hereby incorporated by reference in its entirety.

TECHNICAL FIELD OF THE INVENTION

The present invention relates in general to the field of bore plugs, and more particularly, to an improved bore plug with enhanced lateral compression.

STATEMENT OF FEDERALLY FUNDED RESEARCH

None.

REFERENCE TO A SEQUENCE LISTING

None.

BACKGROUND OF THE INVENTION

Without limiting the scope of the invention, its background is described in connection with fluid handling and more particularly, to an improved apparatus and method for plugging a tubular bore.

After tubing and piping is manufactured, it is often necessary or desirable to protect the interior of the tubing and piping from the outside environment. This may especially be true if threads have been machined into the interior end surfaces of the tubing or piping. Furthermore, after tubing or piping is installed for its intended purpose, it is often necessary to pressure test the system to ensure that all the piping or tubing is properly joined so that there will be no leaks when the system is placed into service. Additionally, it is often desired to maintain a positive pressure on the tubes or piping to prevent corrosion or other damage to the interior of the tubes while they are being stored or shipped or during construction, such as providing an internal gas purge during welding.

The prior art teaches many different types of plugs that have been designed to plug the ends of the tubular bores of pipes and tubing. U.S. Pat. No. 5,771,937 a device for plugging a pipe includes a resilient, hollow body member that expands with the application of internally applied pressure to block the pipe, much like blowing up a balloon inside of a tubular bore. This system requires a source of compressed air or other gas to inflate the balloon.

U.S. Pat. No. 5,119,861 a device is disclosed for plugging a pipe that comprises an elastomer seal. The resilient elastomeric seal is attached to the perimeters of two axially aligned rigid end plates. This device relies upon the elasticity of the elastomeric seal to draw the end plates together while radially expanding so as to engage and seal against the inner wall of a tubular bore. This device lacks any means for tightening the seal beyond the force exerted by the elastomer as the elastomer is allowed to relax from a stretched position.

U.S. Pat. No. 4,968,197 a device is disclosed that includes a disc-like screw plate, an elastic sealing ring, a horn-like pressure block and a lifting eye. The screw plate receives the bottom edge of the sealing ring and the horn-like pressure block is mounted on the upper edge. The screw plate has a central rod that extends upwardly through a hole in the pressure block.

The lifting eye is then threaded received on the end of the rod and as the lifting eye is turned, the block and plate are urged together causing the sealing ring to expand against the internal wall of a pipe.

The present inventors had also previously submitted U.S. Patent Application 20040074549 directed to a Bore Plug, now expired.

SUMMARY OF THE INVENTION

The present invention represents an improvement over the prior Bore Plug. The improvements over the prior design include those features claimed herein. The present invention includes An apparatus for plugging a tubular bore, comprising: a shaft member; one or more cylindrical compressible seals slideably disposed around the shaft member, wherein the shaft member passes axially through the one or more cylindrical seals; one or more cylindrical hard sleeves having one or more conical ends slideably disposed around the shaft member and adjacent to the one or more cylindrical seals, wherein the one or more conical ends increase compression of the seal along the shaft member closer to the shaft; a flange attached at or near a distal end of the shaft member, wherein the flange retains the cylindrical sleeves and cylindrical seals on the shaft member; and a pulling mechanism disposed at or near a proximal end of the shaft member, wherein the seal is positioned between the flange and the one or more cylindrical hard sleeves such that compression of the seal causes it to expand away from the shaft member. In one aspect, the apparatus has two or more cylindrical seals, the cylindrical seals are separated by at least one of the one or more cylindrical hard sleeves.

In another aspect, the apparatus further comprises: a pressure valve, wherein the shaft member is hollow and wherein the pressure valve is secured within the hollow shaft member at or near the proximal end of the shaft member. In another aspect, the pressure valve is secured within the hollow shaft by threads and/or by a pneumatic valve having a spring-loaded seal. In one aspect, is brass or metal. In another aspect, cylindrical seals are neoprene, e.g., an elastomer, rubber and/or synthetic rubber. In yet another aspect, the cylindrical sleeves and the flange are a material selected from the group comprising nylon, brass, aluminum and combinations thereof. The cylindrical sleeves and the flange may be metal. In another aspect, the cylindrical sleeves, the flange and the shaft member are made of different materials or the same material. In another aspect, the pulling mechanism comprises a nut disposed on a threaded outer circumference of the proximal end of the shaft member. In another aspect, the pulling mechanism further comprises a washer disposed adjacent to a distal end of the nut, wherein the washer diameter is greater than a diameter of the tubular bore. In another aspect, the pulling mechanism causes the hollow shaft member to slide axially in a proximal direction within the one or more cylindrical sleeves and the one or more cylindrical seals.

In another aspect, the bore plug further comprises one or more compressible sealant holders slideably disposed around the shaft member. In another aspect at least one end of the compressible sealant holder is adjacent to one of the one or more cylindrical sleeves. In another aspect, the compressible sealant holder is a spring or a wave spring. Certain examples of diameters for use with the present invention is a difference in a diameter of the one or more cylindrical sleeves and a diameter of the tubular bore is between about 0.02 inches and about 0.2 inches. In another aspect, a difference in a diameter of the one or more cylindrical sleeves and a diameter of the tubular bore is between about 0.03 inches and about 0.13 inches.

In another embodiment, the present invention includes a method of plugging a tube, comprising: inserting an expandable plug into a tubular bore, a plug comprising: a shaft member; one or more cylindrical compressible seals slideably disposed around the shaft member, wherein the shaft member passes axially through the one or more cylindrical seals; one or more cylindrical hard sleeves having one or more conical ends slideably disposed around the shaft member and adjacent to the one or more cylindrical seals, wherein the one or more conical ends increase compression of the seal along the shaft member closer to the shaft; a flange attached at or near a distal end of the shaft member, wherein the flange retains the cylindrical sleeves and cylindrical seals on the shaft member; and a pulling mechanism disposed at or near a proximal end of the shaft member; and compressing the one or more cylindrical seals, wherein the seal is positioned between the flange and the one or more cylindrical hard sleeves such that compression of the seal causes it to expand away from the shaft member to seal the tubular bore. In one aspect, the step of compressing the one or more cylindrical seals further comprises: tightening a nut disposed on a threaded outer circumference of a proximal end of the shaft member, wherein the pulling mechanism comprises the nut and wherein the pulling mechanism exerts an axial force on the shaft member in a proximal direction to compress the one or more cylindrical seals at the conical ends, thereby increasing the compression along the seal. In another aspect, the method further comprises: inserting a sealant into a compressible sealant holder, wherein the sealant holder is slideably disposed around the shaft member and is adjacent to one of the one or more cylindrical sleeves; compressing the sealant holder during the step of compressing the one or more cylindrical seals; expelling the sealant from the sealant holder as the sealant holder compresses. In another aspect, the shaft member is hollow and wherein the expandable plug further comprises a pressure valve secured within the hollow shaft, the method further comprising: opening the pressure valve before compressing the one or more cylindrical seals; allowing a fluid in the tubular bore to flow through the pressure valve while compressing the one or more cylindrical seals. In another aspect, the methods further comprises: determining the pressure within the tubular bore after sealing the tubular bore; and adding additional fluid through the pressure valve to achieve a desired pressure within the tubular bore. In yet another aspect, the method further comprises: opening the pressure valve; removing fluid through the pressure valve to achieve a desired pressure within the tubular bore.

BRIEF DESCRIPTION OF THE DRAWINGS

For a more complete understanding of the features and advantages of the present invention, reference is now made to the detailed description of the invention along with the accompanying figures and in which:

FIG. 4 shows the bore plug before engagement and FIG. 5 shows the compression after engagement of the bore plug at the point of compression;

FIG. 6 shows the bore plug before engagement and FIG. 7 shows the compression after engagement of the bore plug at the point of compression; FIG. 8 shows the bore plug before engagement and FIG. 9 shows the compressions after engagement of the bore plug at the point of compression.

DETAILED DESCRIPTION OF THE INVENTION

Figure 1:
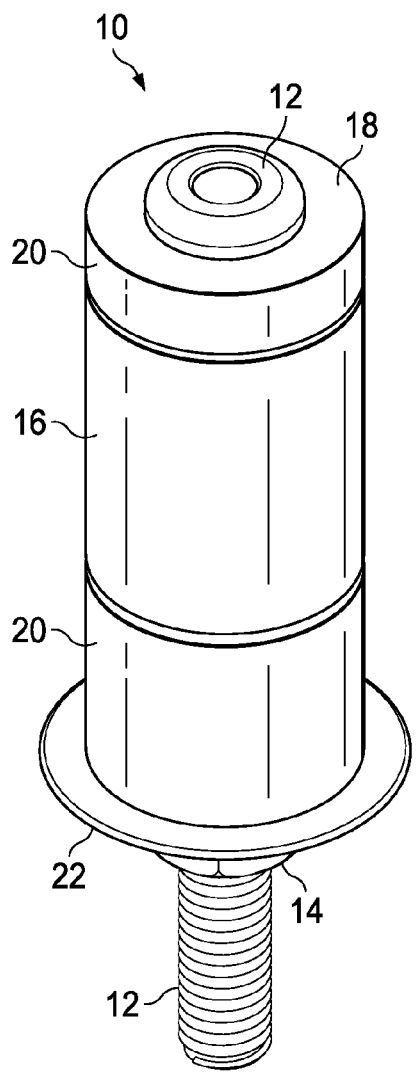
FIGS. 1 and 2 are lateral views of the bore plug of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The term "plug" or "plug fitting" broadly encompasses any type of fitting or connection which may be frictionally held in a hole.

The term "shaft" as used herein refers to any elongated threaded body such as a bolt or shaft, as well as a spindle. The terms "axial" and "axially" used herein refer to a direction generally parallel to the axis of a shaft.

The term "bore" as used herein refers to an open projection having a circular cross-section. The term "flange" as used herein is generally understood as a separable connecting element.

As used herein the term "sealant" is intended to include any adhesive material which is used for filling voids and interstices to provide a seal against moisture, dust, solvents and/or other fluids.

The term "threads" as used herein includes grooves and other structures wherein overlapping interengaging surfaces hold an element against axial separation.

The term "pressure valve" as used herein, refers a device for one or more of controlling, regulating, adjusting, maintaining, and releasing pressure.

In describing the present invention, the term "distal end" is used herein to refer to the end closest to the normally exposed shaft member. The term "proximal end" is used herein to refer to the end farthest from the normally exposed shaft member.

The term "brass" or "brass alloy" as used herein denotes an alloy wherein the principal constituents are copper and zinc. Brass alloys which may be employed include not only binary alloys, but also ternary alloys, such alloys containing additional incidental ingredients such as nickel and tin present in minor amounts.

As used herein the term "washer" is intended to encompass any tubular member which is subjected to axial forces. The term "spring" as used herein refers to an elastic body that recovers its original shape when released after being distorted. A spring behaves in accordance with Hooke's Law in that it will undergo substantial distortion within its elastic limit and thereafter recover its original shape. The term is not intended to connote the infinitesimal distortion which is detectable in a normally rigid body when subjected to great stress.

As used herein the term "circumference" is intended to signify an inner or outer edge of an object in one plane, and is not limited to a circular shape. As used herein the term "diameter" is defined to include the conventional definition of a line across a circular cross-section through the center of that cross-section. In some instances, the elements described herein as having a diameter may be non-circular. In those instances, the term "diameter" refers to a line across the non-circular cross-section, in most instances through a center point of the non-circular cross-section.

One problem with the existing tubular bore plugs is that they provide no way for pressurizing the tubular bore after a plug is installed or for checking whether a tubular bore is under a positive pressure after the tubular bore plug has been installed. Without first installing an additional valve on the tube or pipe, the prior art devices do not provide a way for maintaining a positive pressure within a sealed tubular bore or provide ways for increasing or decreasing the pressure.

Another problem that existing tubular bore plugs cannot solve is installing a bore plug when there is a flow of fluid coming out of the tubing or piping. The prior art bore plugs may be installed properly only when the pipe is completely out of service. What is needed is a tubular bore plug that may be installed when there is a fluid flow in the tubular bore and further provides a means for pressuring or maintaining a positive pressure within the tubular bore after the bore plug has been installed.

The present inventors have overcome the problems with prior art bore plugs by providing for conical compression fittings that increase the lateral compression about the shaft member toward the inside portion of the tubing that is engaged by the sleeves having the conical ends.

The hollow shaft member providing an axis for the expandable plug may have any diameter and length suitable for plugging a tubular bore. The hollow shaft member may take any form, but the shaft member is cylindrical. Advantageously, the hollow shaft member with the pressure valve may be a standard valve as used on a truck or automobile tire. The standard valve used on tires includes the valve stem, which is a hollow tube, and the valve core, often called a Schrader valve, which is inserted into the valve stem. These standard valves are available from Schrader-Bridgeport, a Delaware corporation. Furthermore, valves having a standard bore core chamber No. 1 as defined by the Tire and Rim Association, are available in varying lengths, from about 2 inches to about 6 inches, and have a standard ID of about 0.21 inches and a standard OD of about 0.31 inches. Other standard sizes are also available, such as standard bore core chamber No. 2 and standard bore chamber No. 3, also as defined by the Tire and Rim Association. If a particular tubular bore plugging application requires a plug length different than the standard lengths available for tire valves, the standard valve stems may be lengthened or shortened by cutting or by adding additional stem material by means well known to those having ordinary skill in the art.

The standard truck and automobile tire valves are often rated for a maximum working pressure of about 300 psig but the spring loaded pressure valves are available for much higher working pressures if required for a particular bore plugging application. The bore plug of the present invention has successfully maintained pressures on tubular bores up to about 500 psig. Typically, however, the normal application is 25 psig or less, in particular, those application for use with very long tube lengths, e.g., 1,000, 2,500, 5,000, 10,000, 20,000, 30,000, 40,000 or even 50,000 feet in length. In addition to being used for tires, the pneumatic type valves having a spring-loaded seal as discussed above are also used conventionally by many other industries, such as the refrigeration and air conditioning industry. The hollow shaft member is made of a metal and more is made of brass, aluminum, copper or a combination thereof.

The flange on the second end of the hollow shaft member may comprise one or more ribs, a plate or other form secured to the hollow shaft member suitable for retaining the cylindrical seals and sleeves on the hollow shaft. The flange is of the same material as the hollow shaft member and is a metal, for example, brass, aluminum, copper or a combination thereof.

The cylindrical seals, through which the hollow shaft member passes as an axis, are made from a resilient pliable material that is suitable for forming a seal when expanded against the inner surface of the tubular bore. The cylindrical seals are made of a thermoplastic, e.g., the cylindrical seals may made of an elastomer. Alternatively, the cylindrical seals may be made of, e.g., synthetic or natural rubber, composite materials, black nylon. Neoprene is one material for the cylindrical seals but other elastomers may be superior for plugging a tubular bore containing corrosive or other difficult to handle materials. Selection of all materials used in the present invention may be made based upon the plugging application as known to those having ordinary skill in the art. An advantage of providing cylindrical seals made of a resilient, pliable material is that a tight seal may be formed even in a tubular bore having imperfections or threads because the seal material fills voids, such as threads or pits, and molds itself around protrusions, such as a tube seam.

The cylindrical sleeves through which the hollow shaft member passes as an axis are made of a metal. The sleeves are made from brass, aluminum, copper or a combination thereof. The sleeves may be bushings and are made from a material that is sufficiently strong to transfer compressive forces to the cylindrical seals, thereby making the seals expand against the inner wall of the tubular bore to create the seal. It should be noted that the hollow shaft member, the flange, the pulling mechanism and the cylindrical sleeves may all be made of the same material or individual components may be made of different materials or combinations of materials.

The expandable plug of the present invention may be used to plug cylindrical bores having a wide range of diameters. The diameter of the expandable bore is varied by changing the diameters of the cylindrical seals and cylindrical sleeves. The clearance between the unexpanded plug and the interior walls of the tubular bore is typically less for a small diameter tubular bore than for a large diameter tubular bore because there is less volume of elastomer making up the cylindrical seals in the smaller diameter expandable plug. For example, for tubular bores having an inner diameter (ID) of less than 0.5 inches, one clearance is about 0.0625 inches. For tubular bores having an ID of about 1 inch, another clearance is about 0.125 inches. Generally, the clearance between the sides of the plug and the ID of the tubular bore may be between about 0.02 inches and about 0.2 inches. The clearance between the sides of the plug and the ID of the tubular bore may be between about 0.03 inches and about 0.13 inches.

The arrangement and number of the cylindrical seals and the cylindrical sleeves may vary as long as the arrangement provides for the cylindrical seals to be compressed between the pulling mechanism and the flange. In one embodiment, two separate cylindrical seals are used to facilitate uniform circumferential fitting of the expandable plug into the tubular bore. Furthermore, the use of two cylindrical seals helps prevent the expandable plug from becoming cocked at an angle either during or after sealing the tubular bore with the expandable plug. Furthermore, the ability for the bore plug to be self-aligning and to remain aligned within the tubular bore increases with increasing length of the cylindrical seals. In one embodiment, though not required, the cylindrical seal is compressed between two cylindrical sleeves rather than one cylindrical sleeve and the flange.

As noted above, a flange and a pulling mechanism are provided at opposite ends of the hollow shaft member of the compressible plug. As an axial force is exerted by the pulling mechanism upon the hollow shaft member, the resulting compressive forces compress the cylindrical seals causing them to radially expand, thereby creating the seal in the tubular bore. In one embodiment, two cylindrical seals and three cylindrical sleeves are arranged on the hollow shaft member in the following order, starting at the distal end: flange, first sleeve, first seal, second sleeve, second seal, third sleeve, and pulling mechanism. In this arrangement, the first and second sleeves exert compressive forces on the first cylindrical seal and the second and third sleeves exert compressive forces on the second cylindrical seal. Alternatively, the flange may replace one of the sleeves, providing an arrangement as follows: flange, first seal, first sleeve, second seal, second sleeve, and pulling mechanism. As one having ordinary skill in the art will recognize, there are many different arrangements and numbers of cylindrical seals and cylindrical sleeves that may be placed on the hollow shaft member in accordance with the present invention. Optionally, sleeves and seals may also be placed adjacent to each other as long as the compressive forces may be exerted against the seals to force the seals to expand radially.

The pulling mechanism is a device that applies an axial force to the hollow shaft member, thereby causing the hollow shaft member to slide in a proximal direction through the axial openings of the cylindrical seals and cylindrical sleeves through which the hollow shaft member passes. The pulling mechanism further prevents the cylindrical seals and cylindrical sleeves from being pulled from the tubular bore, thereby exerting compressive forces on the cylindrical seals. The pulling mechanism may be a pulley device through which forces exerted on a wire running through the pulley and attached to the hollow shaft member exerts axial forces upon the hollow shaft member. Alternatively, the hollow shaft member may comprise teeth that engage a pawl to form a ratchet mechanism similar to that found in a standard caulking gun.

In one embodiment, the pulling mechanism comprises a nut that is screwed onto a threaded portion of the hollow shaft member and a washer that has a diameter greater than the diameter of the tubular bore. The washer is located adjacent to the nut on a distal end of the nut. To create the seal in the tubular bore, the expandable plug is placed into the tubular bore and the washer is held against the opening of the tubular bore. As the nut is tightened, an axial force is applied to the hollow shaft member causing the hollow shaft member to slide in a proximal direction through the axial openings of the cylindrical seals and cylindrical sleeves, thereby placing the seals in compression between the flange and the washer. As the nut continues to be tightened, greater compressive forces are generated, causing the cylindrical seals to expand radially against the interior wall of the tubular bore, thereby creating a seal. Typically, two to four turns of the nut are sufficient to create enough compressive force on the cylindrical seals to create the seal for the tubular bore. However, for a given application and expandable plug, a fewer number or greater number of turns may be required.

A special tool may be used to hold the washer of the pulling mechanism against the tubular bore opening while tightening the nut. The tool comprises a handle for gripping the tool and a threaded port in the handle. The hollow shaft member is threaded on the outer surface of the proximal end so that the hollow shaft member may be secured in the threaded port of the handle. A stationary pin in the center of the threaded port depresses the plunger pin of the pressure valve located within the hollow shaft member as the hollow shaft member is secured to the handle. Advantageously, if there is a flow of fluid through the tubular bore while the expandable seal is being inserted, the fluid can flow through the open pressure valve and through the handle, thereby venting through a second port on the handle. Optionally, a hose may be connected to the second port to direct the flow away from the user. After the cylindrical seals have radially expanded to create the seal, the special tool may be removed, causing the pressure valve to close as the plunger pin on the pressure valve is released.

To remove the expandable plug from the tubular bore, the procedure may be reversed. The axial force on the hollow shaft member is removed, thereby removing the compressive forces being applied on the cylindrical seals. With the compressive forces removed, the cylindrical seals contract radially so that the expandable plug may be removed from the cylindrical bore. If the expandable seal has been installed for a period long enough for the cylindrical seals to have lost some of their resilience, the force required to pull the expandable plug is increased. Temporary installations of the expandable plugs of the present invention should be replaced after a set period that may be determined by factors dependant on an individual plugging applications, such as temperature, pressure, vibration, expansion, contraction, corrosive conditions and other factors known to those having ordinary skill in the art. Typically, the expandable plugs are not reusable without at least first providing new cylindrical seals but there are tubular bore plugging applications where re-use would be acceptable.

The pressure valve contained within the hollow shaft member of an embodiment provides advantages over conventional tubular bore plugs. The pressure valve allows a positive pressure of air or an inert gas to be achieved within the plugged tubular bore. Because a pressure valve is the readily available tire valve, a conventional tire pressure gauge may be used to easily measure the positive pressure within the tubular bore. If the pressure is too low, compressed air or another gas may be injected through the tire valve to raise the pressure within the sealed tubular bore, thereby protecting the walls of the tubular bore from corrosion or other damage resulting from exposure to the outer environment. Furthermore, the pressure may similarly be checked before removing the plug from the tubular bore, thereby providing increased safety to a user by providing a means to check the pressure and relieve any pressure before the user removes the expandable plug. Alternatively, if monitoring pressure within the tubular bore or injecting additional gas or other fluid is not desired, the expandable plug of the present invention may be practiced without the pressure valve and the hollow shaft member may be replaced with either a solid shaft member or a capped hollow shaft member. The present invention may be practiced in all other aspects that do not involve the internal pressure valve regardless of whether the shaft member is hollow or solid. Therefore, if the functions of the pressure valve are not required, the invention may be practiced without the pressure valve and with a solid or capped shaft member.

Another embodiment of the present invention provides an expandable seal for plugging a tubular bore permanently. In this embodiment, one or more compressible sealant holders are slideably disposed upon the hollow shaft member. In one embodiment, the sealant holder is a coiled spring. A sealant holder may be used that is a wave spring because the wave spring provides a higher volume, for a given spring length, between the coils prior to compression. A sealant may be a sealing epoxy, readily available in both one and two component forms and well known to those having ordinary skill in the art. Prior to inserting the expandable plug into the tubular bore, the sealing epoxy is packed between the coils of the spring disposed upon the hollow shaft member. Then, as the pulling mechanism exerts axial forces upon the hollow shaft member to compress the cylindrical seals, the spring is also compressed, forcing the sealing epoxy out from between the coils and into the void areas between the expandable plug and the tubular bore. The sealing epoxy is packed into the void areas creating a permanent seal.

Figure 2:
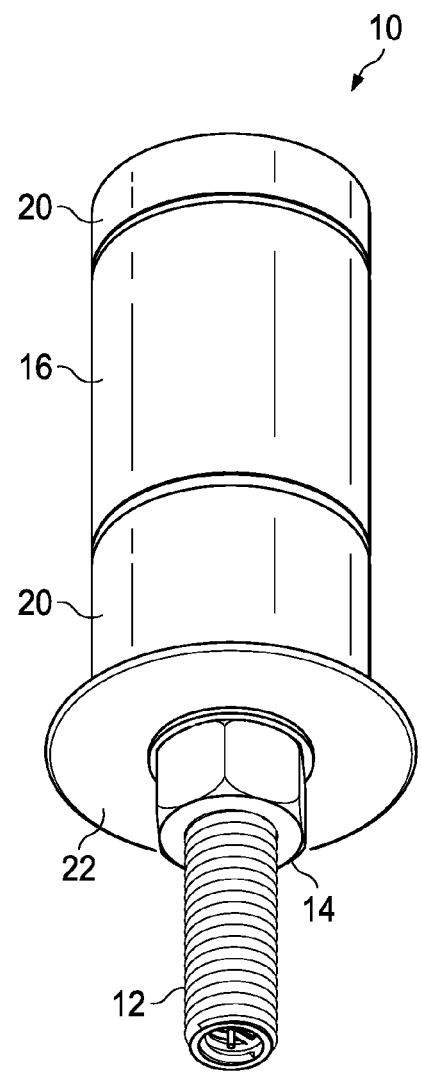

FIGS. 1 and 2 are side views of the bore plug apparatus 10, that includes a shaft member 12 with nut 14 around threads on the shaft member 12 (generally hollow). A generally cylindrical compressible seal 16 surrounds the shaft member 12 and is positioned between a internal flange 18 and one or more cylindrical hard sleeves 20 that are positioned, in these figures, on either side of the cylindrical compressible seal 16. An external flange 22 is shown that prevents the bore plug from completely entering a tube, thereby serving the dual purpose of acting as a compression flange and to prevent the bore plug from going into the tube.

Figure 3:
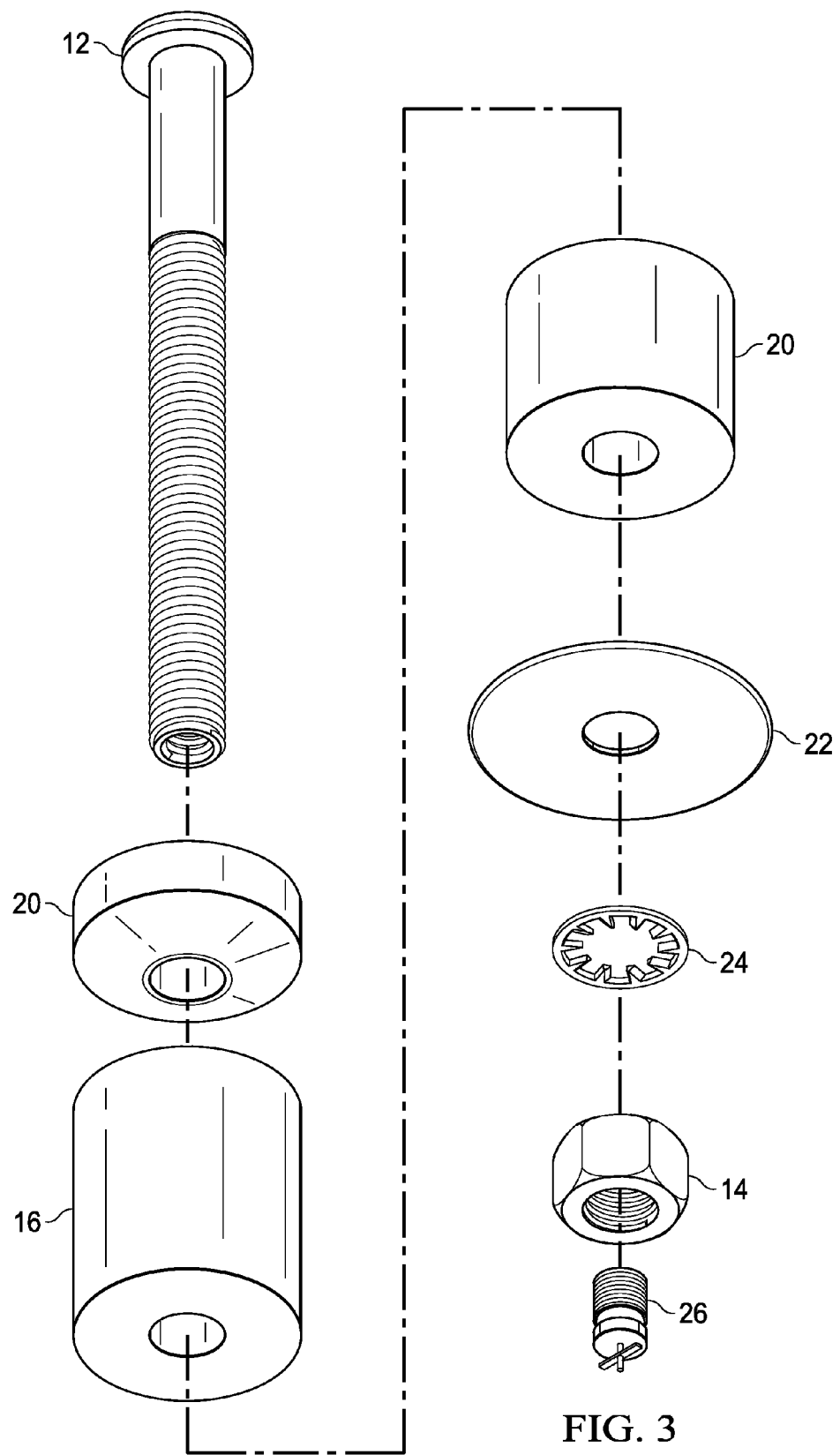
FIG. 3 is an exploded view of the components of the bore plug of the present invention.

FIG. 3 is an exploded view of the bore plug apparatus 10, that includes a shaft member 12 with nut 14 around threads on the shaft member 12. A generally cylindrical compressible seal 16 surrounds the shaft member 12 and is positioned between a flange 18 and one or more cylindrical hard sleeves 20 that are positioned, in these figures, on either side of the cylindrical compressible seal 16. A washer 24 is depicted to be positioned between external flange 22 and nut 14. Finally, in certain embodiments in which air or other internal pressure is used to cause compression of the cylindrical compressible seal 16, a spring-loaded, pin activated pressure valve 26 is depicted.

If there is a flow of gas through the shaft member 12 while the bore plug 10 is being installed, then the pressure valve 26 is open while the cylindrical compressible seals 16 are being compressed. By allowing gas to flow through the pressure valve 26 during the compression of the cylindrical seals, a good seal may be achieved when there is a flow of gas or other fluid through the shaft member 12. Nut 14 exerts an axial force on the shaft member 12 and can be used to partially compress the one or more cylindrical hard sleeves 20, the cylindrical compressible seal 16 against internal flange 18 and external flange 22, while not expanding the cylindrical compressible seal 16 to an outer diameter greater than the internal diameter of a tube that is intended to be plugged.

Figure 4:
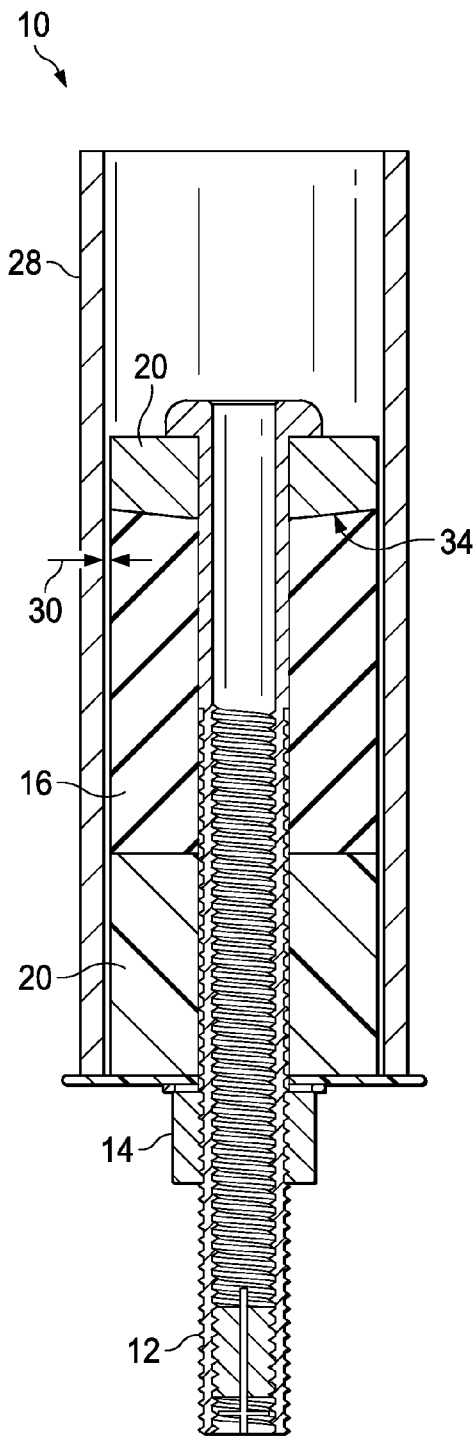
FIGS. 4 and 5 are cross-sectional views of the improved bore plug of the present invention.
Figure 5:
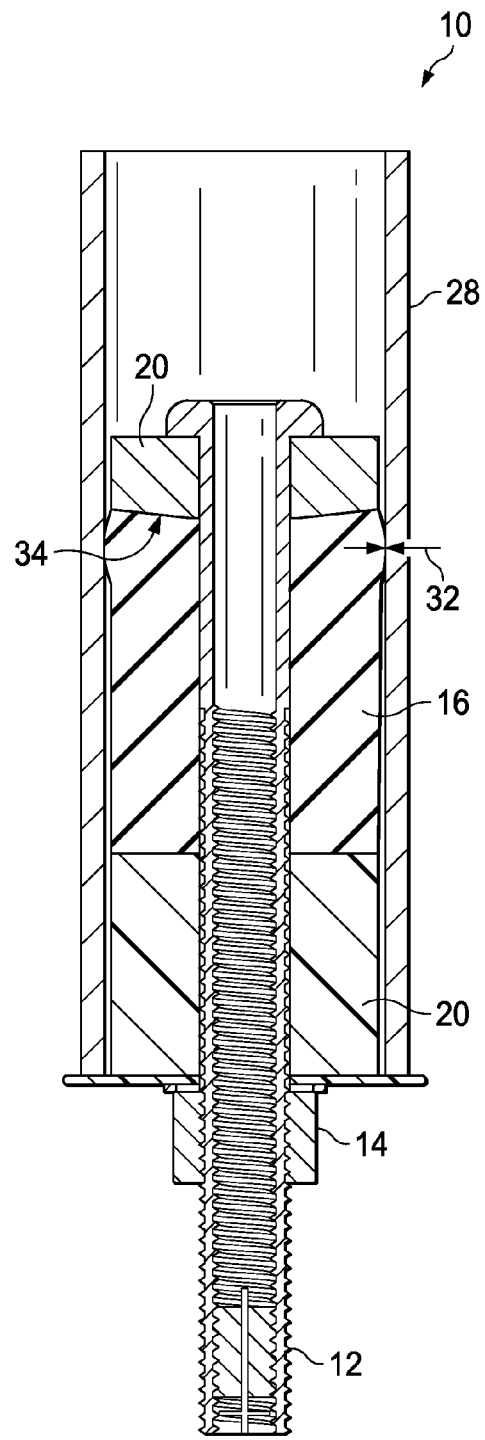

The present invention is best described with the following figures. FIGS. 4 and 5 are cross-sectional views of the improved bore plug 10 of the present invention. FIG. 4 shows the bore plug 10 before engagement of the cylindrical compressible seals 16, which includes a clearance 30 between a tube 28 and the bore plug apparatus 10.

FIG. 5 shows the compression after engagement of the bore plug 10 at the point of compression 32 caused by the conical portion 34 of the cylindrical hard sleeve 20. The cylindrical compressible seal 16 expands to close the clearance 30 at the specific point along the cylindrical compressible seal 16 that greatly enhances the strength of the fit or engagement of the bore plug 10 in the tube 28.

Figure 6:
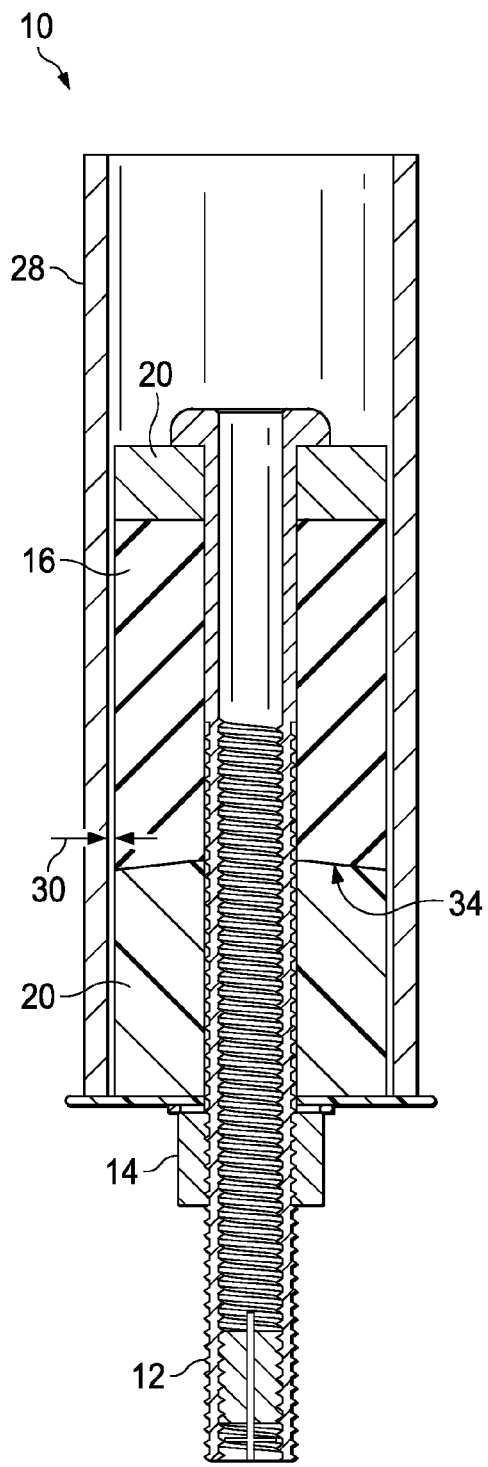
FIGS. 6 and 7 are cross-sectional views of an alternative improved bore plug of the present invention.
Figure 7:
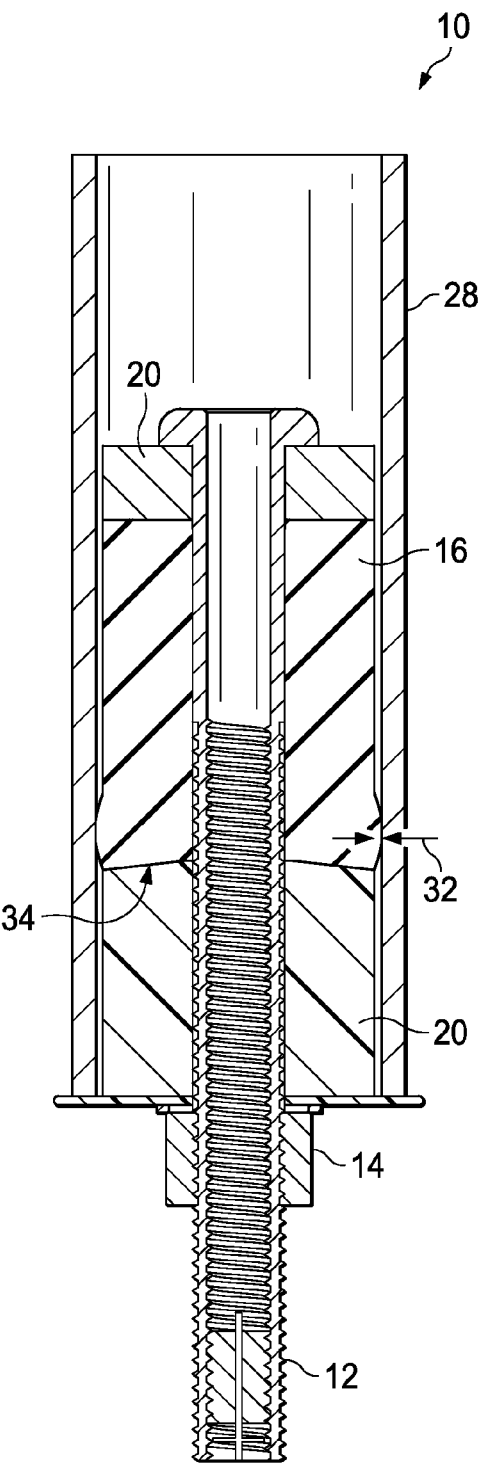

FIGS. 6 and 7 are cross-sectional views of an alternative improved bore plug of the present invention. FIG. 6 shows the bore plug 10 before engagement of the cylindrical compressible seals 16, which includes a clearance 30 between a tube 28 and the bore plug apparatus 10.

FIG. 7 shows the compression after engagement of the bore plug 10 at the point of compression 32 caused by the conical portion 34 of the cylindrical hard sleeve 20. The conical portion 34 of the cylindrical hard sleeve 20 is angled from 5 to about 15 degrees, and will most often us an angle of 5, 6, 7, 9, 10, 11, 12, 13, 14, or 15 degrees from the radial cross-section. The cylindrical compressible seal 16 expands to close the clearance 30 at the specific point along the cylindrical compressible seal 16 that greatly enhances the strength of the fit or engagement of the bore plug 10 in the tube 28.

Figure 8:
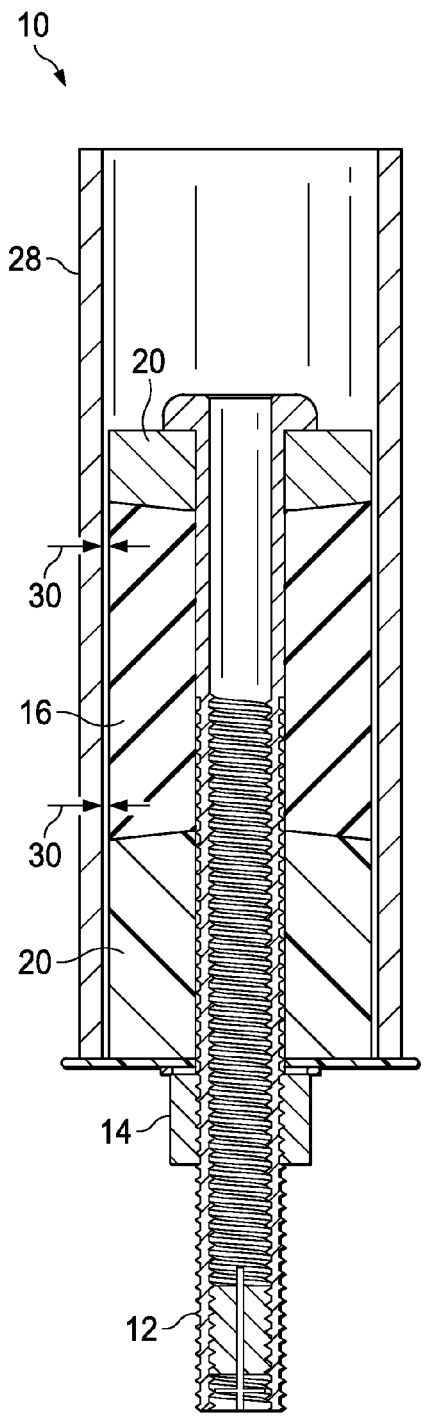
FIGS. 8 and 9 are cross-sectional views of an another alternative improved bore plug of the present invention.
Figure 9:
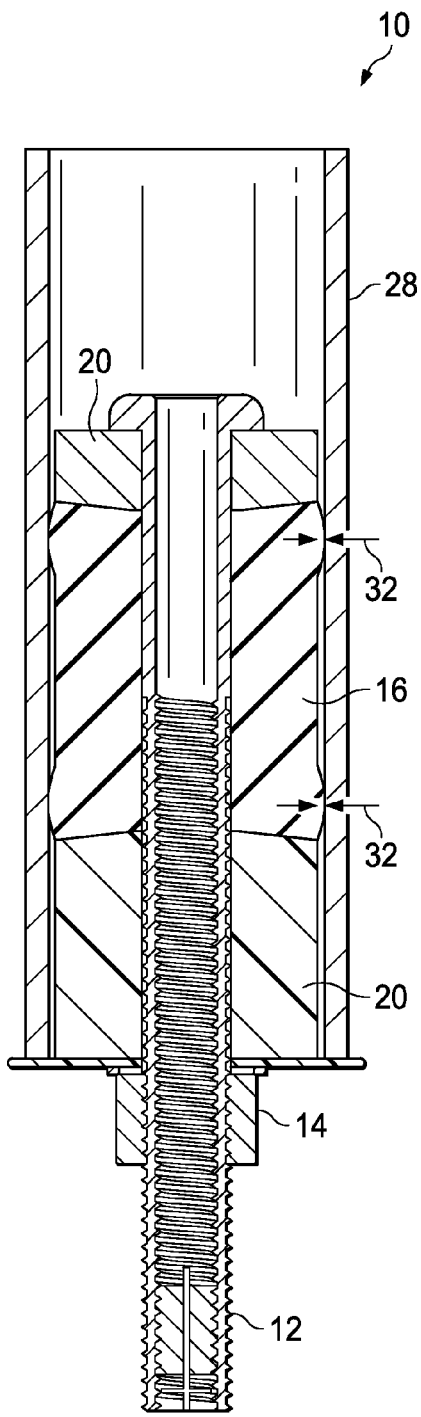

FIGS. 8 and 9 are cross-sectional views of an another alternative improved bore plug of the present invention, FIG. 8 shows the bore plug 10 before engagement and FIG. 9 shows the compressions after engagement of the bore plug at two points of compression 32.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

U.S. Pat. No. 5,119,861: Fail Safe Pipe Plug.
U.S. Pat. No. 4,968,197: Blank Duct Plug.

What is claimed is:

1. An apparatus for plugging a tubular bore, comprising:
   a shaft member;
   one or more cylindrical compressible seals slideably disposed around the shaft member, wherein the shaft member passes axially through the one or more cylindrical seals;
   one or more cylindrical sleeves having one or more conical ends slideably disposed around the shaft member and adjacent to the one or more cylindrical seals, wherein the one or more conical ends increase compression of the seal along the shaft member closer to the shaft;
   a flange attached at or near a distal end of the shaft member, wherein the flange retains the cylindrical sleeves and cylindrical seals on the shaft member; and
   a pulling mechanism disposed at or near a proximal end of the shaft member, wherein the seal is positioned between the flange and the one or more cylindrical hard sleeves such that compression of the seal causes it to expand away from the shaft member.

2. The apparatus of claim 1, wherein the apparatus has two or more cylindrical seals, the cylindrical seals are separated by at least one of the one or more cylindrical sleeves.

3. The apparatus of claim 1, further comprising: a pressure valve, wherein the shaft member is hollow and wherein the pressure valve is secured within the hollow shaft member at or near the proximal end of the shaft member.

4. The apparatus of claim 3, wherein the pressure valve is secured within the hollow shaft by threads.

5. The apparatus of claim 3, wherein the pressure valve is a pneumatic valve having a spring-loaded seal.

6. The apparatus of claim 1, wherein the shaft member is brass.

7. The apparatus of claim 1, wherein the shaft member is a metal.

8. The apparatus of claim 1, wherein the cylindrical seals are neoprene.

9. The apparatus of claim 1, wherein the cylindrical seals are a material selected from the group comprising an elastomer, rubber and synthetic rubber.

10. The apparatus of claim 1, wherein the cylindrical sleeves and the flange are a material selected from the group comprising nylon, brass, aluminum and combinations thereof.

11. The apparatus of claim 1, wherein the cylindrical sleeves and the flange are metal.

12. The apparatus of claim 1, wherein the cylindrical sleeves, the flange and the shaft member are made of different materials.

13. The apparatus of claim 1, wherein the pulling mechanism comprises a nut disposed on a threaded outer circumference of the proximal end of the shaft member.

14. The apparatus of claim 13, wherein the pulling mechanism further comprises a washer disposed adjacent to a distal end of the nut, wherein the washer diameter is greater than a diameter of the tubular bore.

15. The apparatus of claim 1, wherein the pulling mechanism causes the hollow shaft member to slide axially in a proximal direction within the one or more cylindrical sleeves and the one or more cylindrical seals.

16. The apparatus of claim 1, further comprising: one or more compressible sealant holders slideably disposed around the shaft member.

17. The apparatus of claim 16, wherein at least one end of the compressible sealant holder is adjacent to one of the one or more cylindrical sleeves.

18. The apparatus of claim 16, wherein the compressible sealant holder is a spring.

19. The apparatus of claim 1, wherein a difference in a diameter of the one or more cylindrical sleeves and a diameter of the tubular bore is between about 0.02 inches and about 0.2 inches.

20. The apparatus of claim 1, wherein a difference in a diameter of the one or more cylindrical sleeves and a diameter of the tubular bore is between about 0.03 inches and about 0.13 inches.

* * * * *